United States Patent [19]
Townsend

[11] Patent Number: 5,993,868
[45] Date of Patent: Nov. 30, 1999

[54] METHOD FOR APPLYING A LIQUID TO THE SURFACE OF AN EXTRUDED STRAND OF MEAT EMULSION

[76] Inventor: Ray T. Townsend, 3131 Fleur Dr., Des Moines, Iowa 50321

[21] Appl. No.: 09/010,472

[22] Filed: Jan. 21, 1998

[51] Int. Cl.⁶ .............................. A23P 1/12; A22C 11/00; A22C 11/02
[52] U.S. Cl. ......................... 426/105; 426/135; 426/516; 452/32; 452/35
[58] Field of Search ..................................... 426/105, 135, 426/413, 516, 517; 452/27, 32, 33, 34, 35, 36

[56] References Cited

U.S. PATENT DOCUMENTS

| | | |
|---|---|---|
| Re. 28,281 | 12/1974 | Bridgeford . |
| 2,575,467 | 11/1951 | Reichel et al. .............................. 99/176 |
| 3,399,423 | 9/1968 | Kielsmeier et al. ......................... 17/35 |
| 3,622,353 | 11/1971 | Bradshaw et al. . |
| 3,640,735 | 2/1972 | Oppenheimer et al. ................... 99/176 |
| 3,698,916 | 10/1972 | Moreland . |
| 3,767,821 | 10/1973 | Deacon et al. . |
| 3,922,364 | 11/1975 | Townsend . |
| 4,026,985 | 5/1977 | Rasmussen . |
| 4,730,367 | 3/1988 | Vinokur ..................................... 17/49 |
| 4,882,051 | 11/1989 | Itoh ........................................ 210/248 |
| 4,905,587 | 3/1990 | Smithers . |
| 4,944,069 | 7/1990 | Townsend et al. .......................... 17/49 |
| 4,949,430 | 8/1990 | Stanek . |
| 4,958,412 | 9/1990 | Stanek . |
| 5,238,442 | 8/1993 | Townsend . |

*Primary Examiner*—Nina Bhat
*Assistant Examiner*—Drew Becker
*Attorney, Agent, or Firm*—Zarley, McKee, Thomte, Voorhees & Sease

[57] ABSTRACT

A method of applying liquid, such as liquid smoke to the outer surface of an extruded sausage strand, involves locating a rotatable inner tube within a stationary outer tube; rotating an elongated casing on the stationary outer tube, and advancing the casing longitudinally over a discharge end of the inner tube; simultaneously rotating the inner tube within the outer tube and extruding a meat emulsion strand in a rotatable direction out of the discharge end to move the rotating meat emulsion into the rotating casing; and introducing a fluid material on the inside of the casing material for deposit on a strand of meat emulsion being discharged from the discharge end of the inner tube. The casing material is of the non-osmosis type. The casing and discharged meat emulsion rotate in the same direction at the same speed. A fluid, such as liquid smoke, is introduced between the rotating casing and the rotating strand of meat, which rotate in the same direction and at the same speed to prevent any turbulence from developing in the meat emulsion. The lack of turbulence prevents the liquid smoke from becoming mixed into the meat emulsion.

4 Claims, 5 Drawing Sheets

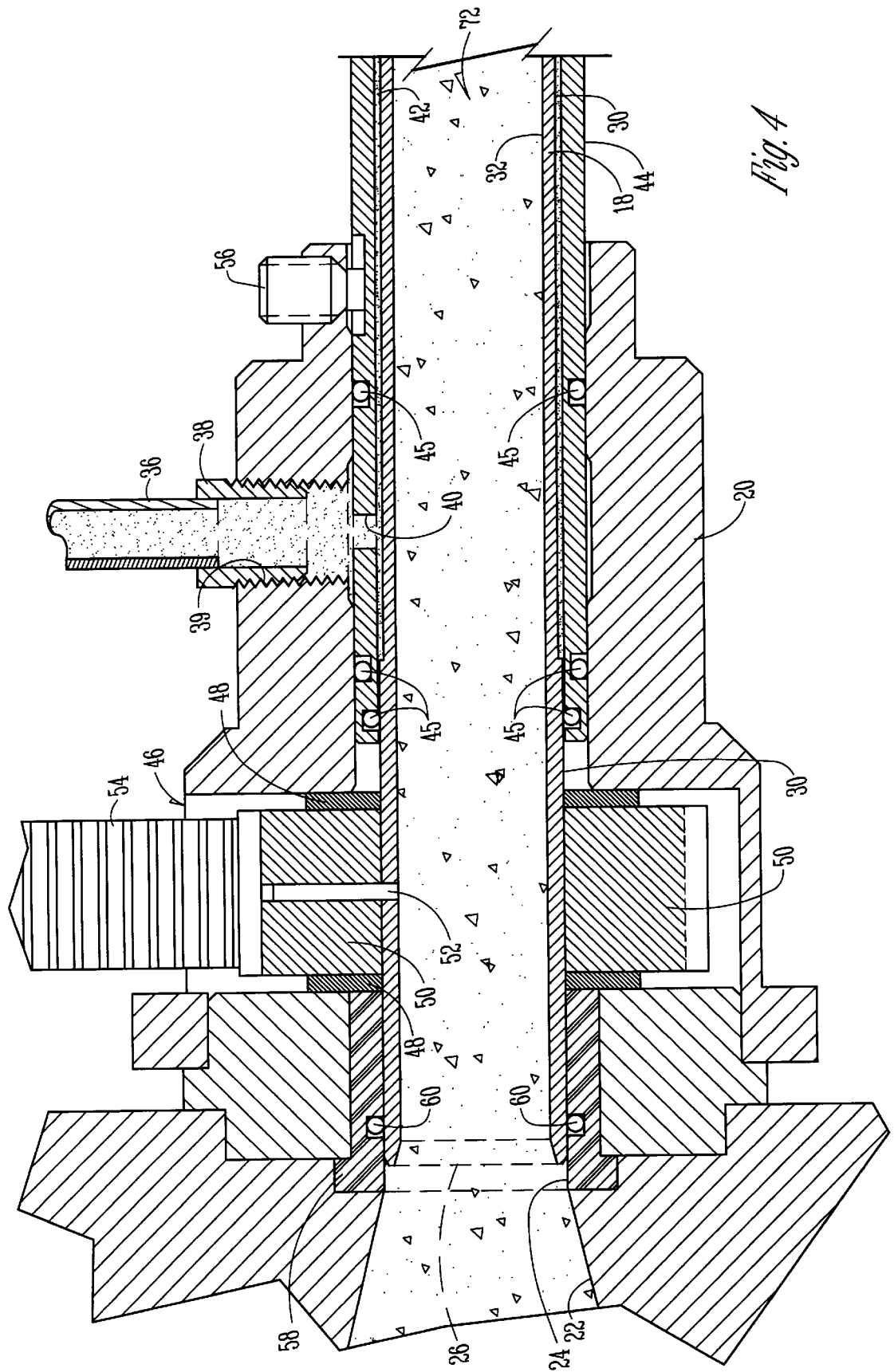

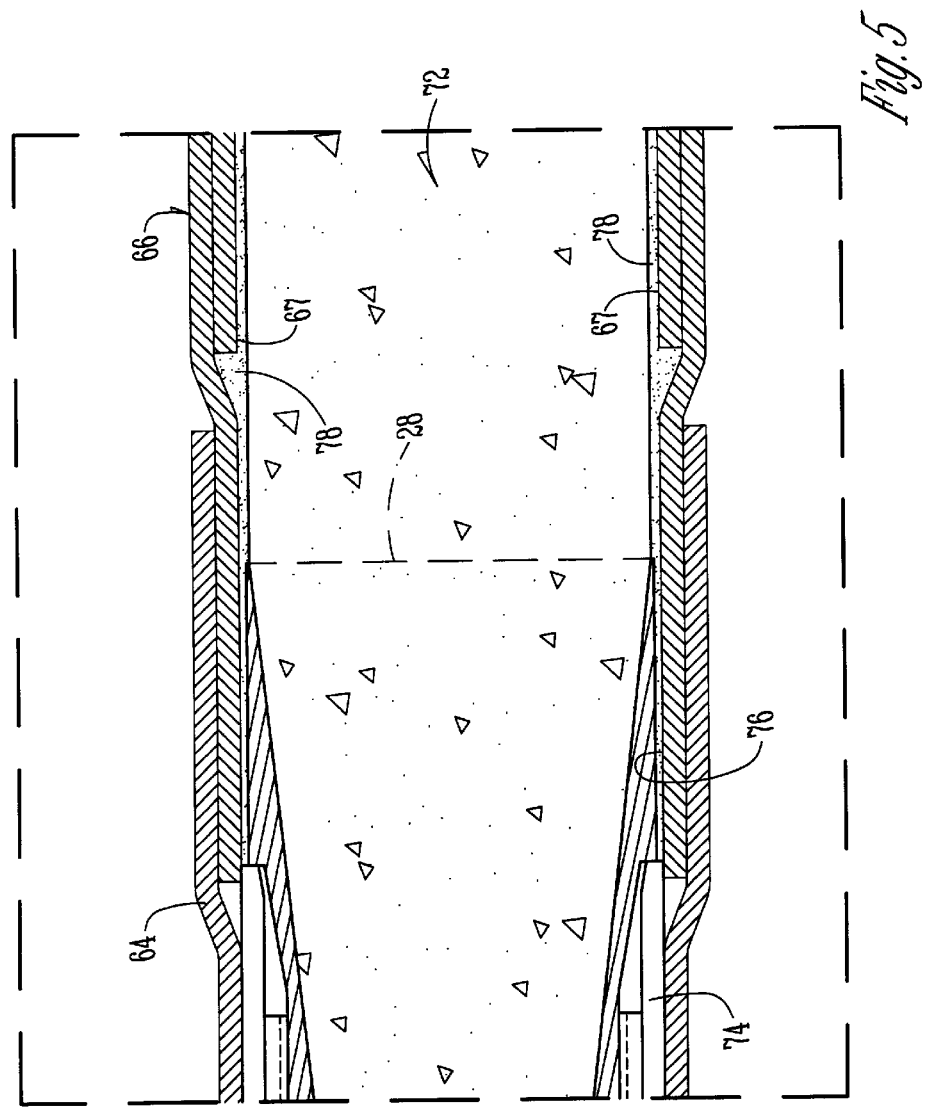

METHOD FOR APPLYING A LIQUID TO THE SURFACE OF AN EXTRUDED STRAND OF MEAT EMULSION

BACKGROUND OF THE INVENTION

From the beginning of the sausage industry, the sausage has always been made in a casing that would facilitate osmosis. The first sausage was made from animal intestines and osmosis was used to get the smoke through the casing and onto the surface of the sausage without penetrating into the sausage. The smoke, whether liquid smoke or natural, must not be mixed through the emulsion because it causes a bitter taste. Eventually, the industry developed an artificial casing that had the qualities of osmosis, and that has been the standard for many years.

When the casing is stuffed with sausage, it is then hung in a smokehouse so that natural smoke passes through the casing by osmosis and unites with the surface only of the sausage, the chemical reaction between the smoke and protein of the sausage forms an artificial skin on the outside surface of the sausage. After processing, the original casing is discarded. Again, it is very important that the smoke does not mix with the sausage other than just at the surface of the sausage, and under the artificial casing. The artificial casing that is capable of osmosis is very expensive and yet it is used almost exclusively, other than natural casing, for making most kinds of sausage. Some attempts have been made to introduce liquid smoke to a sausage strand, but they have not been greatly successful because the liquid became mixed into the sausage. See U.S. Pat. No. 5,238,442.

When a long shirred casing is used, which is standard practice, the stuffing meat horn must be quite small in diameter in order to take the shirred casing. This means that as the casing is stuffed on a small diameter horn, the velocity of the emulsion coming out of the horn is quite great and any liquid smoke on the inside of the casing would be mixed with the meat emulsion due to the turbulence of the emulsion. This unavoidable turbulence, because of the diameter of the casing compared to the diameter of the small horn extruding the emulsion, is the principal reason why it has never been successful to put the smoke inside the surface of the casing as it is being injected with emulsion.

It is therefore a principal object of this invention to provide a method and means of applying a liquid to the surface of an extruded strand of meat emulsion which will prevent the liquid from becoming intermixed with the strand of meat emulsion.

A further object of this invention is to rotate a casing and a strand of meat emulsion in the same direction and at the same velocity so that when liquid is applied therebetween as the meat emulsion is discharged into the casing, turbulence in the meat emulsion will be avoided.

A still further object of this invention is to provide a method and means of applying a liquid to the surface of an extruded strand of meat emulsion which can eliminate the use of an osmosis-type casing material.

These and other objects will be apparent to those skilled in the art.

SUMMARY OF THE INVENTION

A method of applying liquid, such as liquid smoke to the outer surface of an extruded sausage strand, involves locating a rotatable inner tube within a stationary outer tube; rotating an elongated casing on the stationary outer tube, and advancing the casing longitudinally over a discharge end of the inner tube; simultaneously rotating the inner tube within the outer tube and extruding a meat emulsion strand in a rotatable direction out of the discharge end to move the rotating meat emulsion into the rotating casing; and introducing a fluid material on the inside of the casing material for deposit on a strand of meat emulsion being discharged from the discharge end of the inner tube. The casing material is of the non-osmosis type. The casing and discharged meat emulsion rotate in the same direction at the same speed.

The apparatus for performing the foregoing method has a frame with an elongated stationary outer tube thereon. A rotatable tube is concentrically mounted within the outer tube. Power components are on the frame for extruding a meat emulsion through the inner tuber while it is rotating, and for winding a strip material into a casing on the outer tube wherein the formed casing slides and rotates as it progresses down the stationary tube to receive meat emulsion from a discharge end of the inner tube. A fluid, such as liquid smoke, is introduced between the rotating casing and the rotating strand of meat, which rotate in the same direction and at the same speed to prevent any turbulence from developing in the meat emulsion. The lack of turbulence prevents the liquid smoke from becoming mixed into the meat emulsion.

BRIEF DESCRIPTION OF THE DRAWINGS

FIG. 4 is an enlarged scale sectional view taken on line 4—4 of FIG. 3;

FIG. 5 is an enlarged scale sectional view taken on line 5—5 of FIG. 3; and

FIG. 6 is an enlarged scale sectional view taken on line 6—6 of FIG. 3.

DESCRIPTION OF THE PREFERRED EMBODIMENT

Figure 2:
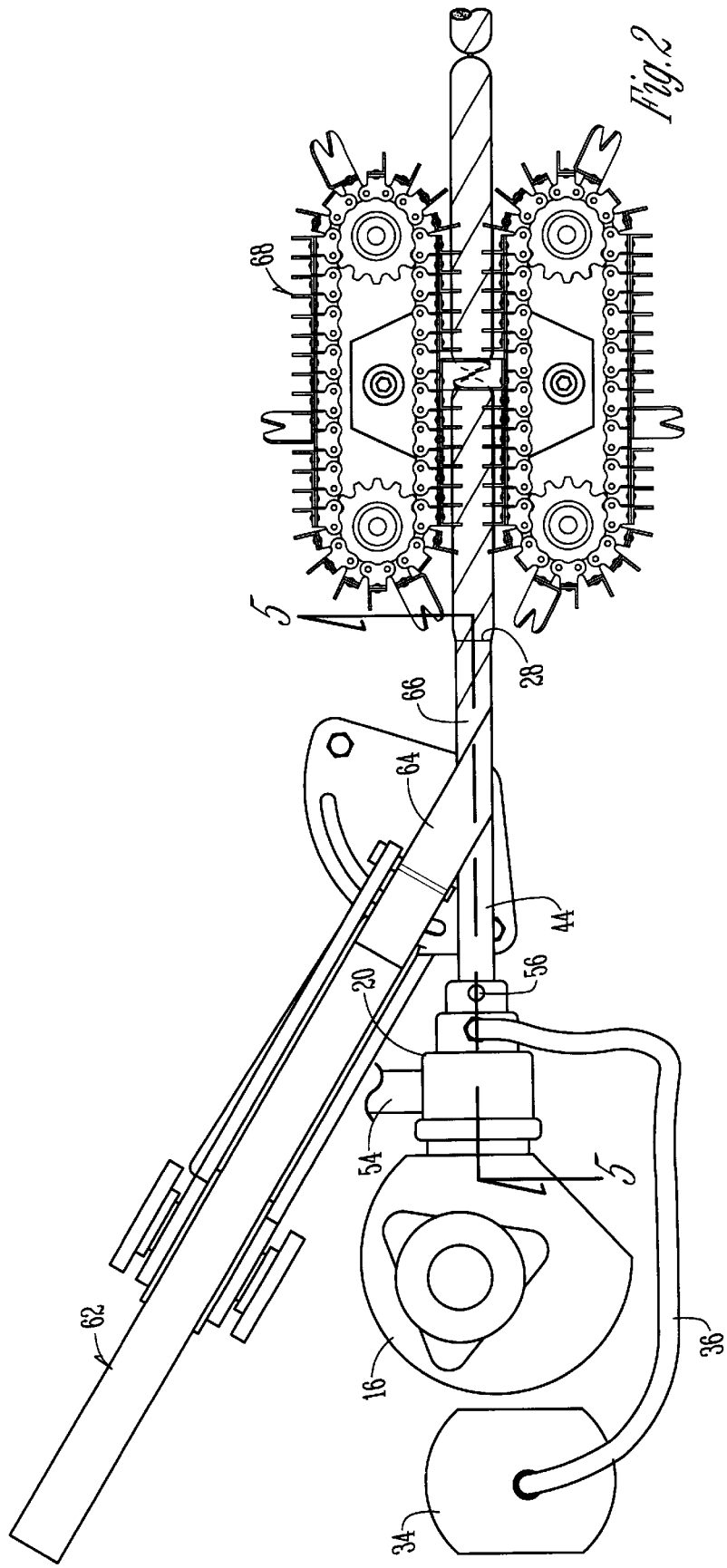
FIG. 2 is a top plan view at an enlarged scale taken on line 2—2 of FIG. 1.
Figure 3:
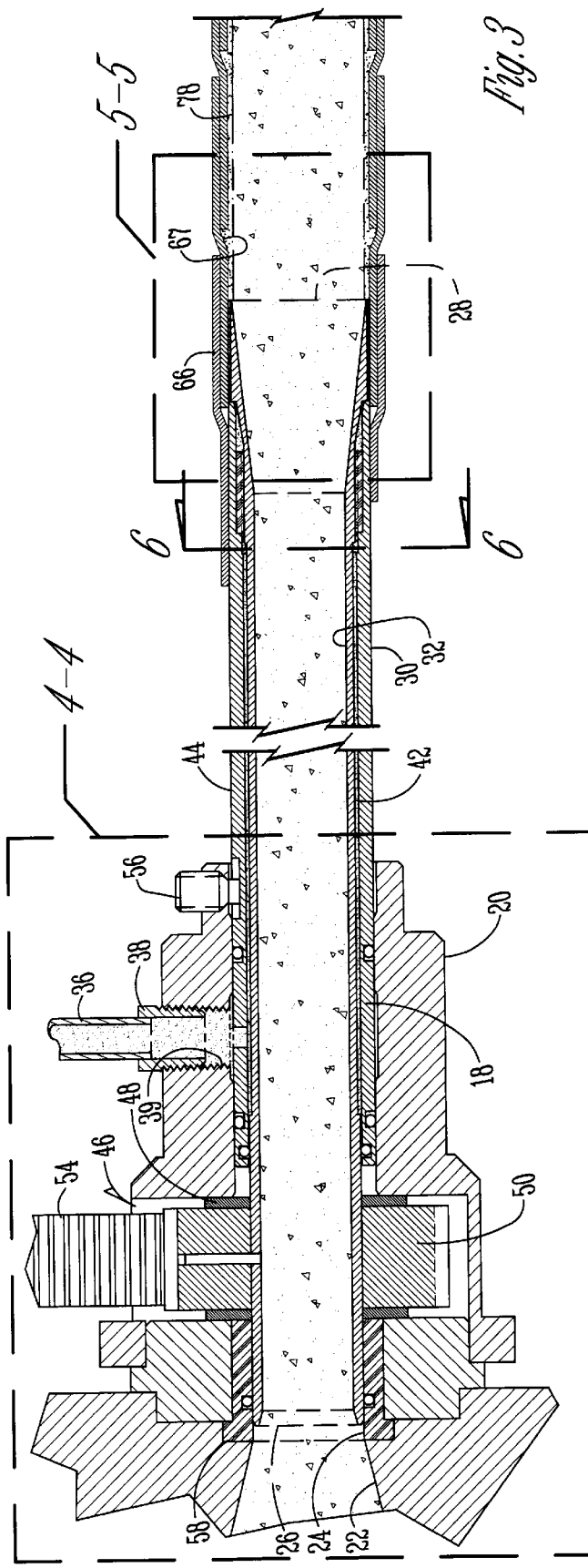
FIG. 3 is an enlarged scale longitudinal sectional view taken through the concentric inner stuffing tube and outer tube.

The meat stuffing machine 10 has a frame body 12 with four supporting legs 14. A conventional meat emulsion pump 16 connected to a source of meat emulsion (not shown) is mounted on the top of machine 10 immediately upstream of meat stuffing horn 18. As best shown in FIGS. 2–4, meat emulsion pump 16 has a block 20 having a meat emulsion bore 22 into which the upstream end of stuffing horn 18 is rotatably mounted. Bore 22 registers with bore 24 of block 20. The numeral 26 designates the inlet end of stuffing horn 18; 28 is the outlet end thereof; 30 is the exterior surface thereof; and 32 is the interior surface (FIG. 4) thereof.

With reference to FIG. 2, a liquid pump 34 for pumping liquid smoke or the like is mounted on the top of machine 10 and is connected by conduit 36 to threaded fitting 38 which is mounted in a threaded bore 39 of block 20 (FIG. 3). Bore 39 has an outlet 40 immediately adjacent an elongated space 42 (FIG. 4) which is located between horn or tube 18 and stationary tube 44. Space 42 could be comprised of a plurality of spaced elongated grooves. O-ring seals 45 (o-rings) prevent leakage of liquid smoke from space 42.

A belt opening 46 is locate in block 20. Bushings 48 extend around tube 18 on opposite sides of gear 50 which is rigidly secured to tube 18 by pin 52. Gear belt 54 extends around gear 50 and is connected to a source of rotational power (not shown). An anti-rotation screw 56 in block 20 rigidly secures stationary outer tube 44 to block 20.

A bushing 58 (FIG. 4) is located within the center bore 24, and O-ring 60 in bushing 58 extends around inner tube 18 to prevent meat emulsion from moving to the outer surface of tube 18.

Figure 1:
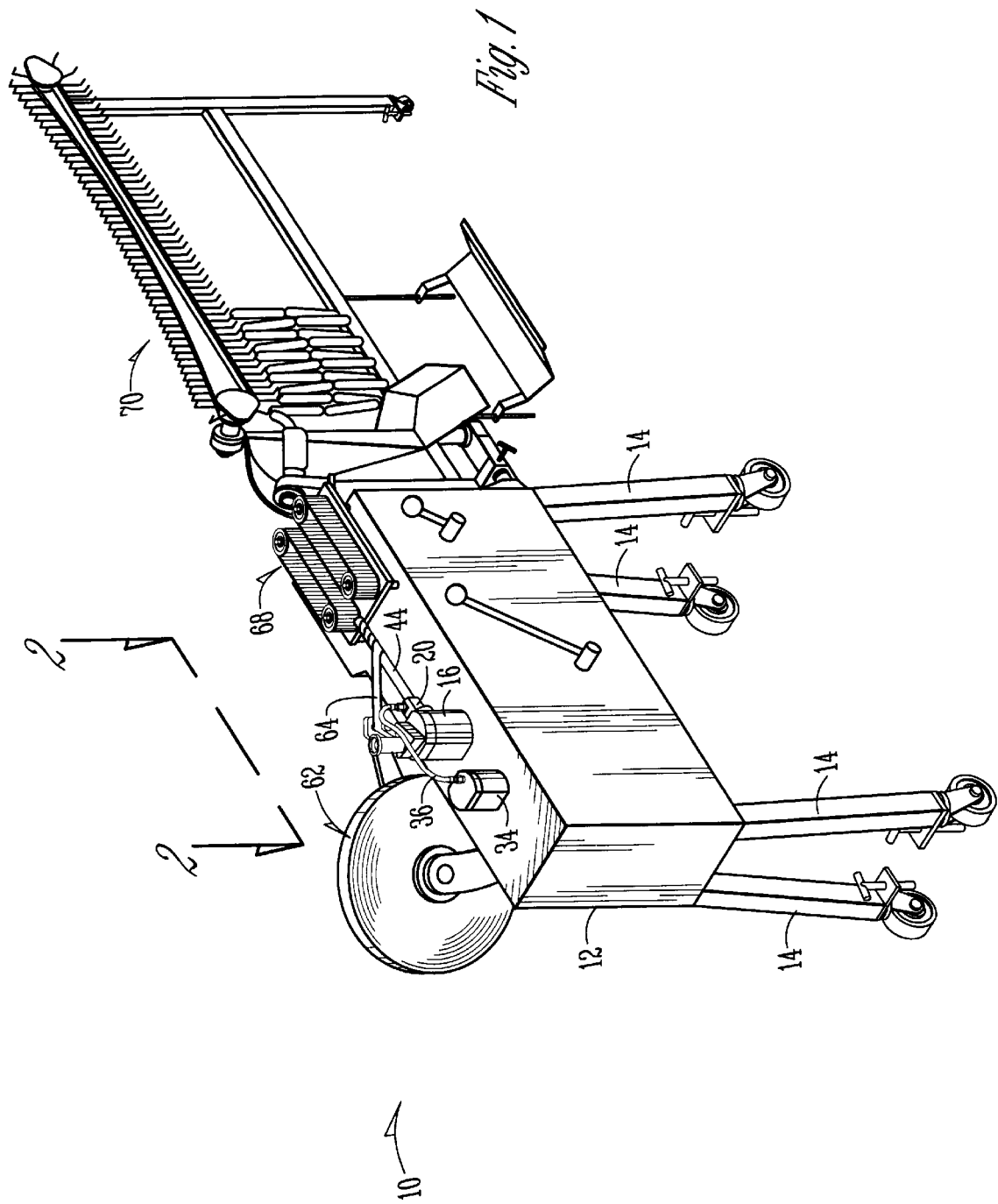
FIG. 1 is a perspective view of the machine of this invention.

A casing ribbon dispensing unit 62 (FIGS. 1 and 2) is mounted on machine 10 in any convenient manner and is adapted to dispense casing ribbon 64 to create a spiral casing 66. The spirally formed casing is created in accordance with the teachings of applicant's U.S. Pat. No. 4,727,625. The teachings of those patents insofar as the creation of the casing are incorporated hereby by reference. Essentially, the spiral casing 66 is created by causing the side edges of ribbon 64 to be frictionally secured to the adjacent side edges of a helix of the casing whereby a continuous casing member is created on the outer surface of the stuffing horn 18. Casing 56 has an interior surface 62 as shown in FIG. 5.

A conventional linking mechanism 68 is mounted on machine 10 and is adapted to conventionally twist the filled casing to create a plurality of links which are discharged from the linking mechanism onto conveyor 70 in conventional fashion.

The numeral 72 designates a meat emulsion strand and the numeral 74 in FIG. 5 designates an annular groove filled with the liquid smoke which is first deposited as a thin film on the interior surface 67 of the casing 66 and then maintains that relative position as the casing is filled thereafter.

The normal operation of this invention requires that ribbon 64 be manually wound around the exterior surface 30 of stuffing horn 18 so that a portion thereof extends beyond the outlet end 28 of stuffing horn 18.

Typically, the outward end of the casing is then tied in a closed condition so that when meat emulsion begins to enter, the casing 66 will be slidably and rotatably moved on the exterior surface of the stationary outer tube 44 and additional convolutions of ribbon 66 will be wound on the exterior surface of the tube 44 to create a continuous hollow casing 66.

At the same time, the liquid pump 34 is energized in any convenient manner to force a flow of liquid smoke or the like to conduit 36, fitting 38, the inlet end 40 of space 42. The fluid is then conveyed through space 42 into the annular groove 74 to the narrow annular space 76 between the outside of flared outer end 28 of inner tube 18. The fluid then is metered out of the annular space 76 (FIG. 5) onto the inner surface 67 of casing 66 to the outer surface of meat emulsion strand 70. The "layer" of fluid on the outer surface of strand 70 is designated by the numeral 78 in FIG. 5.

The ribbon 64 is dispensed by unit 62 by any suitable speed control means (not shown) in such a manner that it is being rotated (and slidably moved) on the outer surface of stationary outer tube 44 at a rotational speed substantially the same as that of inner tube 18. The casing 66 formed by ribbon 64 is also rotated at approximately the same speed as inner tube 18 so that the meat emulsion strand 72 leaving end 28 of tube 18 (FIG. 5) and casing 66 are rotating in the same direction at the same speed. This phenomenon tends to substantially reduce if not eliminate any turbulence in the meat emulsion strand 72 to minimize if not eliminate any mixture of the layer of fluid 78 (of liquid smoke) into the body of the strand. As a result, the extruded strand 72 has only a thin layer of fluid 78 on its outer surface thereof without the fluid being mixed into the body of the strand. The casing 66 can therefore be comprised of a flexible solid plastic material which does not have or need the osmosis capability, because liquid or natural smoke will not ever need to be imposed on the surface of strand 72 from the outside of casing 66 through the material of the casing.

It is therefore seen that this invention will at least accomplish all of its stated objectives.

What is claimed is:

1. A method of applying liquid to the outer surface of an extruded sausage strand, comprising, locating a rotatable inner tube within a stationary outer tube, rotating an elongated casing made of a non-osmosis material on the stationary outer tube, and advancing the casing longitudinally over a discharge end of said inner tube, simultaneously rotating said inner tube within said outer tube and extruding a meat emulsion strand in a rotatable direction out of said discharge end to move said rotating meat emulsion into said rotating casing, and, introducing a fluid material on the inside of said casing material for deposit on the strand of meat emulsion being discharged from the discharge end of said inner tube.

2. The method of claim 1 wherein said fluid material is introduced into said casing adjacent said discharge end of said inner tube.

3. The method of claim 1 wherein said fluid material is liquid smoke.

4. The method of claim 1 wherein said casing and said meat emulsion are rotating in substantially the same direction and at substantially the same velocity at the discharge end of said inner tube.

* * * * *